United States Patent Office 3,278,031
Patented Oct. 11, 1966

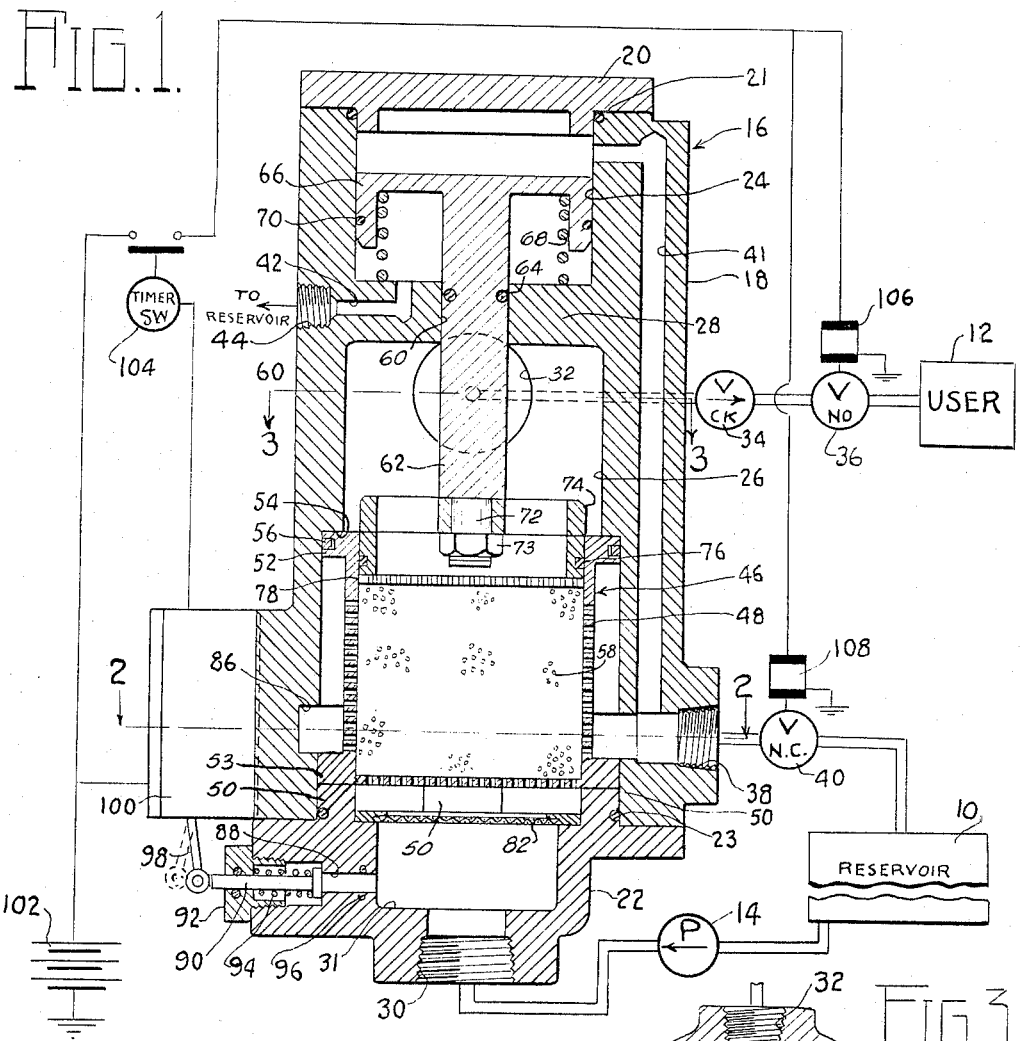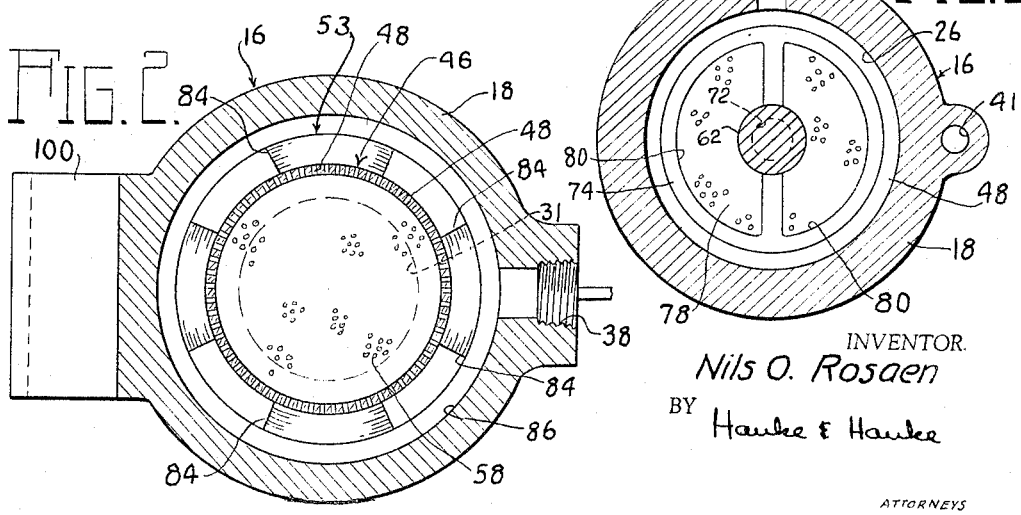

3,278,031
SELF-CLEANING FILTER DEVICE
Nils O. Rosaen, Bloomfield Hills, Mich., assignor to The Rosaen Filter Company, Hazel Park, Mich., a corporation of Michigan
Filed May 13, 1963, Ser. No. 279,923
12 Claims. (Cl. 210—106)

The present invention relates to fluid systems and more particularly to a self-cleaning filter device for such systems.

It is necessary in those fluid systems which require filter devices to either periodically remove and clean or replace the filter element or to provide means for cleaning the filter element in place for no matter how large the filter element may be it will eventually become clogged.

The present invention provides a self-cleaning filter device which includes means operable to sense the clogged condition of the filter element and to actuate means for cleaning the element in place when a predetermined clogged condition has been produced. A unique filter element has been provided which permits the use of means to increase the porosity of the filter element during the cleaning cycle to insure that the collected contaminants will be effectively removed.

It is an object then to increase the operating time of fluid systems utilizing filtering devices by providing means operable to automatically clean the filter element upon a predetermined clogged condition being produced.

It is another object of the present invention to improve fluid filtering devices by providing a unique filter element for such devices and means for selectively varying the porosity of the filter element.

It is still another object of the present invention to improve self cleaning filter devices by providing means operable to increase the porosity of the filter element during the cleaning cycle.

Still further objects and advantages of the present invention will readily occur to one skilled in the art to which the invention pertains upon reference to the following drawings in which like reference characters refer to like parts throughout the several views and in which FIG. 1 is a schematic view of a fluid system of the present invention and in which a preferred filter device is shown in longitudinal cross section.

FIG. 2 is a cross-sectional view as seen substantially from line 2—2 of FIG. 1 and with portions shown in elevation for purposes of clarity, and FIG. 3 is a cross-sectional view as seen substantially from line 3—3 of FIG. 1.

Description

Now referring to the drawings for a more detailed description of the present invention, a preferred fluid system is shown in FIG. 1 as comprising a fluid reservoir 10 connected to a fluid user 12 through a fluid pump 14 and a filtering device 16.

As can be seen in FIGS. 1-3 the preferred filtering device 16 preferably comprises a substantially cylindrical housing member 18. A cap 20 closes one end of the housing member 18 and an O-ring seal 21 is provided between the housing member 18 and the cap 20. An end cap 22 closes the opposite end of the housing member 18 and an O-ring seal 23 is provided between the cap 22 and the housing member 18.

The housing member 18 preferably defines a substantially cylindrical pressure chamber 24 at the end adjacent the cap member 20 and a substantially cylindrical filter chamber 26 at the opposite end. The chambers 24 and 26 are separated by a wall 28.

The end cap 22 is provided with an inlet 30 adapted to be connected to the reservoir 10 through the pump 14 as shown schematically in FIG. 1. An inlet chamber 31 connects the inlet 30 and the filter chamber 26. The housing member 18 is provided with an outlet 32 opening to the upper portion of the filter chamber 26 as can be seen in FIGS. 1 and 3. The outlet 32 is adapted for connection with the fluid user 12 through a resistance check valve 34 and a normally open valve 36 as is shown schematically in FIG. 1. An outlet 38 is also provided in the housing member 18 in communication with the filter chamber 26 as can best be seen in FIGS. 1 and 2. The outlet 38 is adapted for connection with the reservoir 10 through a normally closed valve 40 as shown schematically in FIG. 1. A longitudinally extending passage 41 is provided in the housing member 18 and connects the outlet 38 and the pressure chamber 24. An exhaust passage 42 is provided in the wall 28 and connects the pressure chamber 24 with an exhaust outlet 44. The exhaust outlet 44 is preferably adapted for connection with the reservoir 10 as shown schematically in FIG. 1.

A filter member 46 is carried in a substantially fixed position in the filter chamber 26 intermediate the inlet chamber 31 and the outlets 32 and 38. The filter member 46 preferably comprises an open top preferably cylindrical container 48 constructed of perforated material as shown. The container 48 is provided with radially extending flanges 52–53 at the opposite ends. The flange 52 engages the shoulder 54 provided on the inner wall of the housing member 18. A seal 56 prevents fluid leakage between the flange 52 and the housing member 18. The flange 53 seats on spaced, arcuate projections 50 provided in the cap member 22. The container 48 is preferably partially filled with a plurality of loose filtering particles or elements 58 such as glass beads or the like.

An axially extending opening 60 is provided in the wall 28 and a rod 62 is axially slidably carried in the opening 60. A seal 64 prevents fluid leakage between the rod 62 and the wall 28. A piston 66 is carried in the pressure chamber 24 by the rod 62 so that axial movement of the piston 66 produces a corresponding movement of the rod 62. A spring 68 urges the piston 66 away from the wall 28 and toward the end cap 20. A seal 70 is provided between the piston 66 and the housing member 18.

The rod 62 is provided with a threaded reduced end portion 72 extending into the filter chamber 26. An annular member 74 is carried on the reduced end portion 72 by a nut 73 and is dimensioned to extend into the container 48 and engage the inner peripheral wall thereof. A seal 76 is preferably provided between the annular member 74 and the container 48. A perforated annular top member 78 is axially slidably carried in the container 48 to cover the open end thereof. The top member 78 is engaged by the annular member 74 so that axial movement of the piston 66 against the force of the spring 68 produces a downward axial movement of the top member 78 to compress the filtering particles or elements 58 into a closely fitting engagement.

As can best be seen in FIGS. 1 and 3, the annular member 74 is preferably provided with a pair of arcuate openings 80.

A screen memer 82 is carried in the housing member 18 intermediate the inlet chamber 31 and the filter chamber 26.

As can best be seen in FIG. 2 the flange 53 is preferably provided with a plurality of arcuate openings 84 providing communication between the inlet 30 and the outlet 38 through the inlet chamber, the spaces between the projections 50 and an annular chamber 86 provided in the housing member 18.

A pressure sensing passage 88 is provided in the cap 22 as can be seen in FIG. 1 in communication with the inlet chamber 31. A plunger 90 is axially slidably carried in the passage 88 by a suitable fitting 92. A spring 94 resists outward axial movement of the plunger 90. An O-ring seal 96 prevents fluid leakage past the plunger 90. The free end of the plunger 90 is preferably pivotally connected to an acutating arm 98 of a conventional normally open microswitch 100. The microswitch when actuated electrically connects a source of electrical power 102 to a normally open timer switch 104. The timer switch 104 is operable upon being energized by the microswitch 100 to electrically connect the source of power 102 with solenoids 106 and 108 and to retain this connection for a predetermined time period. The solenoid 106 actuates the valve 36 and the solenoid 108 actuates the valve 40.

In operation fluid is delivered under pressure by the pump 14 to the inlet chamber 31 of the filter device 16. The valve 40 is normally closed so that fluid will fill the chamber 86 past the projections 50 and through the openings 80 and the pressure chamber 24 through the passage 41. The fluid pressure in the chamber 24 produced by the pump 14 will move the piston 66 and the rod 62 axially downwardly against the force of the spring 68 to move the annular member 74 and the cover member 78 downwardly into the container 48 of the filtering member 46. This movement of the cover member 78 and the annular member 74 will force the filtering particles or elements 58 to assume a tightly compacted position to provide an effective filtering action.

Fluid entering the inlet chamber 31 will first pass through the screen 82 to remove large particles of foreign matter on the fluid. This fluid will then flow past the projections 50 through the slots 84 and pass through the perforated container 48 and will be filtered by the filtering particles or elements 58 before passing through the perforated top cover 78 and the arcuate openings 80 of the annular member 74 to the outlet 32 and through the resistance check valve 34 and the normally open valve 36 to the fluid user 12. The exhaust passage 42 and the exhaust outlet 44 prevents air and any fluid which may have found its way past the seals 64 and 70 from being trapped beneath the piston 66.

When the filtering means 46 has become clogged and cleaning is desirable the pressure in chamber 31 will have increased to a value which produces an outward axial movement of the plunger 90 against the force of the spring 94. The arm 98 will be moved by the plunger 90 to the dotted line position shown in FIG. 1 to actuate the microswitch 100. Actuation of the microswitch 100 will energize the timer switch 104 to close the circuit which energizes the solenoids 106 and 108 to move the valve 36 to a closed position and the valve 40 to an open position.

As the valve 40 is opened, pressure is released in the passage 41 and the pressure chamber 24 and the spring 68 will move the piston 66 toward the cap member 20. This movement of the piston 66 will release the compressive forces exerted on the filtering particles 58 by the annular member 74 and the cover member 78 and will permit the filtering particles 58 to assume a less compacted position.

At least a portion of the fluid delivered by the pump 14 will pass through the filtering means 46 and since the filtering particles 58 are no longer tightly compacted together a thorough cleansing action will be produced and the foreign matter which has collected on the particles 58 will be washed through the outlet 38 and back to the reservoir 10.

This cleaning cycle will continue until a predetermined time interval has elapsed and at which time the timer switch will break the solenoid circuit and valves 36 and 40 will return to their normal positions. If the filtering means 46 is still not sufficiently clean, the pressure in chamber 31 occuring when the filtering particles 58 have been returned by the piston 66 to their filtering position will cause the plunger 90 to again move axially outwardly to actuate the microswitch 100 and repeat the cleaning cycle.

It is apparent that a filtering means has been provided in which a thorough cleaning of the filtering particles is produced during a self initiated cleaning cycle. This is produced by the particular filter member disclosed and the means provided for automatically increasing the porosity of the filtering means during operation of the cleaning cycle.

It is also apparent that although I have described but one embodiment of the present invention, many changes and modifications can be made without departing from the spirit of the invention or the scope of the appended claims.

I claim:

1. In combination with a fluid system having a fluid reservoir, a fluid user connected with said reservoir, and a fluid pump delivering fluid from said reservoir to said user, a filtering means comprising
    (a) a housing having a filter chamber and an inlet, a first outlet and a second outlet each opening to said chamber,
    (b) a filter element fixed in said chamber having an inlet side exposed to said inlet and outlet sides exposed respectively to said outlets.
    (c) said inlet and said second outlet being adapted for connection with the fluid reservoir and said first outlet being adapted for connection with the fluid user,
    (d) a normally open valve member disposed intermediate said first outlet and the user and a normally closed valve member disposed intermediate said second outlet and the reservoir whereby fluid is normally directed through said filter element, through said first outlet, and to the fluid user,
    (e) electrical means operable upon being energized to move said normally open valve member to a closed position and said normally closed valve member to an open position so that the fluid is directed through said filter element, through said second outlet, and to the fluid reservoir,
    (f) pressure responsive switching means carried in said housing to sense the fluid pressure at said inlet and being operable upon said pressure increasing to a predetermined value to energize said electrical means, and
    (g) means operably connected with said normally closed valve member and being operable upon said normally closed valve member being moved to an open position to increase the porosity of said filter element.

2. The filtering means as defined in claim 1 and in which said electrical means includes timing means operable to retain said valve members in said moved positions for a predetermined time interval.

3. The device as defined in claim 1 and in which said porosity varying means comprises
    (a) a fluid chamber provided in said housing,
    (b) a piston member movably carried in said fluid chamber,
    (c) a passage provided in said housing connecting one side of said piston with said first mentioned chamber whereby fluid under pressure is normally directed to one side of said piston,
    (d) biasing means carried in said fluid chamber on the opposite side of said piston,
    (e) a movable wall carried by said piston and being normally urged by the fluid pressure exerted on said piston to a position compressing said filter element.

4. A filter device for a fluid system, said filter device comprising,
    (a) a housing having an inlet and an outlet,
    (b) a filtering element carried in said housing intermediate said inlet and said outlet, (c) means operable to vary the porosity of said filter element, (d) pressure responsive means operable to actuate said last mentioned means to increase the porosity of said filtering element upon a predetermined increase in the pressure differential across said filtering element, (e) said filtering element comprising a porous container carried in said housing and a plurality of filtering particles carried in said container, and (f) said porosity varying means comprising a wall member carried in said container and engaging said filtering particles, means normally urging said wall member against some of said filtering particles to impart compression thereto, and means actuated by said pressure responsive means to move said wall member away from said filtering particles upon a predetermined increase in the pressure differential across said filtering element.

5. A filter device for a fluid system, said filter device comprising,
(a) a housing having an inlet and an outlet,
(b) a filtering element carried in said housing intermediate said inlet and said outlet,
(c) means operable to vary the porosity of said filtering element,
(d) pressure responsive means operable to actuate said last mentioned means to increase the porosity of said filtering element upon a predetermined increase in the pressure differential across said filtering element,
(e) said filtering element comprising a porous container carried in said housing and a plurality of filtering particles carried in said container, and
(f) said porosity varying means comprising a wall enclosing one end of said container and being movable in one direction to engage and compress said filtering particles and being movable in an opposite direction to release and decrease the compression forces acting upon said filtering particles, and
(g) said pressure responsive means being operable to move said wall in said opposite direction upon a predetermined increase in the pressure differential across said filtering element.

6. A filter device for use in a fluid system having a fluid user, a fluid reservoir, and pumping means delivering fluid from the reservoir to the user, said filter device comprising,
(a) a housing having an inlet adapted for connection to the fluid reservoir, a normally open first outlet adapted for connection with the fluid user, and a normally closed second outlet adapted for connection with the fluid reservoir,
(b) a filter element carried in said housing and disposed so that fluid flow is normally directed from said inlet through said filter element and to said first outlet to the user,
(c) valve means operable upon being actuated to open said second outlet and close said first outlet so that fluid flow is directed from said inlet through said filter element and said second outlet and to the reservoir,
(d) means operable upon being actuated to increase the porosity of said filter element,
(e) pressure responsive means operably connected with said last mentioned means and said valve means to actuate same upon a predetermined increase in the pressure differential across said filter element,
(f) said filter element comprising an open top porous container carried in said housing and a plurality of filtering particles carried in said container, and
(g) said porosity increasing means comprising a movable wall closing the top of said container and engaging said filtering particles and means actuated by said pressure responsive means to move said wall away from said filtering particles upon a predetermined increase in the pressure differential across said filter element.

7. A fluid system for supplying fluid to a fluid user comprising
(a) a fluid supply source,
(b) a filter device having an inlet connected to said supply source,
(c) fluid pumping means operable to deliver fluid from said supply source to said inlet of said filter device,
(d) said filter device having a normally open first outlet connected to the fluid user, a normally closed second outlet connected with the said supply source, and a filter element disposed within said filter device so that fluid flow normally is directed from said inlet through said filter element and said first outlet to the user,
(e) valve means operable upon being actuated to open said second outlet and close said first outlet so that fluid flow is directed from said inlet through said filter element and said second outlet and to said supply source,
(f) means operable upon being actuated to increase the porosity of said filter element,
(g) means automatically actuating said valve means and said porosity increasing means upon a predetermined increase in the pressure differential across said filter element, and
(h) said last mentioned means comprising
pressure responsive means movable in response to changes in the pressure differential across said filter element,
a solenoid operable to actuate said valve means, and
switching means connecting said pressure responsive means and said solenoid and operable to energize said solenoid upon movement of said pressure responsive means to a predetermined position.

8. A fluid system for supplying fluid to a fluid user comprising
(a) a fluid supply source,
(b) a filter device having an inlet connected to said supply source,
(c) fluid pumping means operable to deliver fluid from said supply source to said inlet of said filter device,
(d) said filter device having a normally open first outlet connected to the fluid user, a normally closed second outlet connected with the said supply source, and a filter element disposed within said filter device so that fluid flow normally is directed from said inlet through said filter element and said first outlet to the user,
(e) valve means operable upon being actuated to open said second outlet and close said first outlet so that fluid flow is directed from said inlet through said filter element and said second outlet and to said supply source,
(f) means operable upon being actuated to increase the porosity of said filter element,
(g) means automatically actuating said valve means and said porosity increasing means upon a predetermined increase in the pressure differential across said filter element, and
(h) said filter element comprising an open top porous container and a plurality of filtering particles carried in said container,
(i) said porosity increasing means comprising a movable wall closing the open top of said container and fluid pressure means normally urging said wall into engagement with said filtering particles to tightly compact same, and
(j) fluid passages connecting said fluid pressure means to said valve means to relieve said fluid pressure means upon actuation of said valve means, 9. The fluid system adapted for connection to a fluid user, said system comprising (a) a fluid reservoir,
(b) a filter device comprising a housing having an inlet connected with said reservoir, a first outlet adapted for connection with said fluid user, and a second outlet connected with said reservoir,
(c) said filter device further comprising a filter element disposed in said housing having one side disposed in registery with said inlet and opposite sides disposed in registry with said outlets,
(d) pumping means delivering fluid from said reservoir to said inlet,
(e) valve means normally opening communication between said first outlet and said fluid user and normally closing communication between said second outlet and said reservoir so that fluid is normally directed from said inlet, through said filter element, and through said first outlet to the user,
(f) pressure responsive means actuating said valve means to close communication between said first outlet and the fluid user and to open communication between said second outlet and said reservoir upon a predetermined increase in the pressure differential across said filter element so that fluid is directed from said inlet through said filter element and through said second outlet to said reservoir,
(g) means actuated by said valve means to increase the porosity of said filter element upon actuation of said valve means, and
(h) timing means operable to retain said valve means in said actuated position for a predetermined time interval.

10. A fluid system adapted for connection to a fluid user, said system comprising
(a) a fluid reservoir,
(b) a filter device comprising a housing having an inlet connected with said reservoir, a first outlet adapted for connection with said fluid user, and a second outlet connected with said reservoir,
(c) said filter device further comprising a filter element disposed in said housing having one side disposed in registry with said inlet and opposite sides disposed in registry with said outlets,
(d) pumping means delivering fluid from said reservoir to said inlet,
(e) valve means normally opening communication between said first outlet and said fluid user and normally closing communication between said second outlet and said reservoir so that fluid is normally directed from said inlet, through said filter element, and through said first outlet to the user,
(f) pressure responsive means actuating said valve means to close communication between said first outlet and the fluid user and to open communication between said second outlet and said reservoir upon a predetermined increase in the pressure differential across said filter element so that fluid is directed from said inlet through said filter element and through said second outlet to said reservoir,
(g) means actuated by said valve means to increase the porosity of said filter element upon actuation of said valve means, and
(h) said actuating means comprising
a member carried in said housing and movable in response to changes in the pressure differential across said filter element,
solenoid means operable upon being energized to actuate said valve means,
switching means connecting said pressure responsive means and said solenoid means to energize same upon movement of said pressure responsive means to a predetermined position.

11. The fluid system adapted for connection to a fluid user, said system comprising
(a) a fluid reservoir,
(b) a filter device comprising a housing having an inlet connected with said reservoir, a first outlet adapted for connection with said fluid user, and a second outlet connected with said reservoir,
(c) said filter device further comprising a filter element disposed in said housing having one side disposed in registry with said inlet and opposite sides disposed in registry with said outlets,
(d) pumping means delivering fluid from said reservoir to said inlet,
(e) valve means normally opening communication between said first outlet and said fluid user and normally closing communication between said second outlet and said reservoir so that fluid is normally directed form said inlet, through said filter element, and through said first outlet to the user,
(f) pressure responsive means actuating said valve means to close communication between said first outlet and the fluid user and to open communication between said second outlet and said reservoir upon a predetermined increase in the pressure differential across said filter element so that fluid is directed from said inlet through said filter element and through said second outlet to said reservoir,
(g) means actuated by said valve means including biasing means to increase the porosity of said filter element upon actuation of said valve means,
(h) said filter element comprising an open top porous container carried in said housing and a plurality of filtering particles carried in said container,
(i) said porosity increasing means comprising a movable wall enclosing the top of said container and normally engaging said filtering particles,
(j) a piston member connected with said movable wall to move said wall toward and away from said filtering particles,
(k) means normally supplying fluid under pressure to one side of said piston member to urge said wall toward said filtering particles, and
(l) means actuated by said valve means to relieve said fluid pressure whereby said piston is moved by said biasing means to move said wall member away from said filtering particles.

12. A fluid system adapted for connection to a fluid user, said system comprising
(a) a fluid reservoir,
(b) a filter device having an inlet connected with said reservoir, a first outlet adapted for connection with said fluid user, a second outlet connected with said reservoir and a filter element disposed within said filter device having an inlet side disposed in registry with said inlet and outlet sides disposed respectively in registry with said outlets,
(c) fluid pumping means operable to pump fluid from said reservoir through said filter device,
(d) valve means operable to normally close communication between said second outlet and said reservoir and to normally open communication between said first outlet and the fluid user,
(e) means operable upon being actuated to move said valve means to a position closing communication between said first outlet and the fluid user and to open communication between said second outlet and said reservoir whereby fluid is directed from said inlet through said filter element and through said second outlet to said reservoir,
(f) means operable to increase the porosity of said filter element upon actuation of said valve means,
(g) pressure responsive means operable to actuate said valve moving means upon the pressure differential across said filter element increasing to a predetermined value,
(h) said filter element comprising a container having inlet means and filtering particles carried in said container, and
(i) said porosity increasing means comprising a movable member, means normally urging said movable member to a position engaging said particles to compress same, and means actuated by said valve means to move said member in a direction away from said filtering particles upon actuation of said valve means.

References Cited by the Examiner

UNITED STATES PATENTS

| | | | |
|---|---|---|---|
| 454,340 | 6/1891 | Fulton | 210—350 X |
| 826,390 | 7/1906 | Van Law | 210—258 |
| 1,453,310 | 5/1923 | Engel | 210—350 X |
| 2,366,112 | 12/1944 | Jokel | 210—106 |
| 2,475,968 | 7/1949 | Jokel | 210—106 |
| 2,999,514 | 9/1961 | Kryzer | 210—138 X |

REUBEN FRIEDMAN, *Primary Examiner.*

D. M. RIESS, *Assistant Examiner.*